United States Patent Office 3,684,478
Patented Aug. 15, 1972

3,684,478
METHOD FOR PRODUCING HIGHLY-FLUXED PELLETS CONTAINING OXIDES OF IRON FROM IN-PLANT WASTE PRODUCTS
Lloyd V. Fegan, Jr., Allentown, and James L. Sloughfy, Bethlehem, Pa., assignors to Bethlehem Steel Corporation
No Drawing. Filed Apr. 2, 1971, Ser. No. 130,802
Int. Cl. C21b 1/30
U.S. Cl. 75—3           7 Claims

ABSTRACT OF THE DISCLOSURE

Highly fluxed iron oxide pellets are made from in-plant waste products and fluxstone. A mix suitable for balling is formed. The mix contains not more than about 35% of in-plant waste products which contain metallic iron and ferrous iron, not less than about 35% in-plant waste products which contain iron oxides, and not more than 30% fluxstone, for example dolomite. The carbon in the mix is not more than about 0.5%. Sufficient water is added to insure proper balling. The mix is balled. The green balls are dried at a temperature in the range of about 212° F. to about 600° F. The dried balls are heated to within a temperature range of about 1000° F. to about 1200° F. wherein a substantial portion of the carbon is burned off and the oxidation of metallic iron and ferrous iron to a higher iron state occurs. The temperature of the dried balls is raised to a range of about 2150° F. to about 2350° F. wherein the balls are hardened to form pellets. Substantially all the metallic iron and ferrous iron are oxidized to the higher valence states.

BACKGROUND OF THE INVENTION

This invention in general is directed to an improved method for producing highly-fluxed pellets containing iron oxides and specifically to a method in which highly-fluxed pellets containing iron oxide are produced from in-plant waste products which contain metallic iron, ferrous iron, iron in higher valence states, and carbon.

The practical and economical utilization of in-plant waste products which contain iron values, from a steel plant has long been a problem. Prior art practices to recover the iron values have not been as successful as desired. The waste products must be treated to prepare them for charging into smelting and refining furnaces. A portion of the in-plant waste products, such as BOF, open hearth and blast furnace fume, are too fine to be charged directly into such furnaces and must be balled. Other in-plant waste products are too coarse to be balled. The in-plant waste materials which are too coarse, are difficult to grind to the size ranges necessary for balling. The materials either break into "flats" or remain as spheres and are difficult to grind to below about —100 mesh sieve size. Prior art practices have been directed to sintering the in-plant waste products. Sintering operations are cumbersome, dirty, expensive, cause air pollution and generally are not successful in producing a good product.

It is an object of this invention to provide a method for producing highly-fluxed pellets containing iron oxides of a high valence state.

It is an object of this invention to provide a method for producing highly fluxed pellets containing iron oxide in which the pellets are substantially free of carbon and metallic iron.

It is an object of this invention to provide a method for producing highly-fluxed pellets containing iron oxide, which method utilizes in-plant waste fines containing carbon, metallic iron and ferrous iron.

It is the object of this invention to provide a method for producing highly-fluxed pellets containing iron oxide from in-plant waste products from a steel plant, which method is efficient and relatively inexpensive and less prone to pollution of air than sintering.

SUMMARY OF THE INVENTION

The invention includes forming a mix of in-plant waste products which contain carbon, metallic iron and ferrous iron and in-plant waste products containing iron oxides. A fluxstone and moisture are added to form a balling mix. The mix is balled. The green balls are dried. The dried balls are fired to remove substantially all the carbon contained therein and to oxidize the metallic iron and ferrous iron. The dried balls are fired at an elevated temperature to form hardened pellets.

PREFERRED EMBODIMENT OF THE INVENTION

It has been found that in-plant waste products which contain metallic iron and ferrous iron and which are difficult to grind and in-plant waste products which contain a relatively high content of carbon, can be processed into highly-fluxed pellets and charged into metallurgical furnaces, wherein the iron values therein can be recovered.

The in-plant waste products which contain metallic iron and ferrous iron and which are difficult to grind to acceptable balling sizes (hereinafter referred to as in-plant fines A) include mill scale, scarfer spittings, magnetic slag fines of BOF sands. In-plant waste products which are easily ground or which may be used with little or virtually no preliminary preparation (hereinafter referred to as in-plant fines B) include blast furnace flue dust which is relatively high in carbon content, up to 50%, hot and cold mill sludges, pellet fines, BOF fume, and open hearth flue dust. The later two in-plant fines B contain iron oxides and little or no carbon and may contain flux materials.

We have found that a mix of not more than about 50% in-plant fines A and not less than about 50% in-plant fines B can be mixed with a fluxstone, for example, dolomite and the like, to produce highly-fluxed pellets containing iron oxides and excess flux suitable for charging into a furnace such as a blast furnace, a basic oxygen furnace and the like. A mix of not more than about 35% in-plant fines A, not less than about 35% in-plant fines B and not more than about 30% of a fluxstone with the addition of moisture sufficient to produce balling consistency, can be formed into green balls suitable for producing highly-fluxed pellets containing iron oxides. It is preferred to use a mix of about 25% in-plant fines A, about 55% in-plant fines B and about 20% dolomite to produce the pellets having good resistance to abrasion and of sufficient strength to resist degradation during transport and when charged into a furnace. We have also found that not more than about 10% of the dolomite can be replaced by high calcium limestone, of course, mixtures of calcium carbonate and magnesium carbonate similar to the composition of dolomite can be added as the fluxstone without adversely affecting the production of the desired pellets.

It is difficult, if not impossible, to produce highly fluxed pellets from mixes of in-plant fines A and in-plant fines B which contain more than about 30% fluxstone. The large quantity of fluxstone lowers the temperature at which liquid forms in the dried green balls. At the temperatures required to form pellets which have sufficient strength to resist abrasion and degradation during handling and to support a burden, sufficient liquid is formed to cause "grape" clustering of the pellets. Then, too, while it is possible to produce some pellets, the pellets were found to have decreased strength as evidenced by lowered values in the compression and tumble index test. To illustrate, a mix of in-plant fines A and in-plant fines B and fluxstone was made having the following composition:

|  | Weight in grams | Percent of mix |
|---|---|---|
| In-plant waste products containing metallic iron (Fines A): | | |
| Mill scale | 428.5 | 8.57 |
| Contractor fines | 400.0 | 8.00 |
| Scarfer spittings | 328.0 | 6.56 |
| BOF classifier sands | 55.0 | 1.10 |
| Total | | 24.23 |
| In-plant waste products containing oxides of iron (Fines B): | | |
| BOF fume | 165.0 | 3.30 |
| Blast furnace flue dust: | | |
| Dry | 298.0 | 5.96 |
| Wet | 215.5 | 4.31 |
| Erie pellet fines | 896.5 | 17.93 |
| Pea Ridge pellet fines | 448.0 | 8.96 |
| Hot and cold mill sludge | 85.0 | 1.70 |
| Total | | 42.16 |
| Fluxstone: | | |
| Dolomite | 1,317.5 | 26.35 |
| Limestone | 363.5 | 7.26 |
| Total | | 33.61 |

The blast furnace flue dust was treated by froth-flotation to reduce the carbon therein so that the carbon content of the entire mixture of in-plant fines and fluxstone was about 0.5%.

The mixture was prepared, balled and fired as shown below:

(a) dry the balls at between 400° F. and 600° F.—7 minutes.
(b) preheat the dried balls at 800° F.—3 minutes
(c) raise the temperature to 1200° F.—13 minutes
(d) raise the temperature to 1800° F.—1 minute
(e) raise the temperature to 2250° F.—16 minutes
(f) discharge the pellets from the furnace.

The pellets were tested by standard tumble and compression tests. The results are shown below:

Test: Results
    Compression, pound/pellet _____ 278
    Tumble Index percent +3 mesh _____ 91.6

The chemical composition of the pellets is as follows:
$Fe^t$ percent _____ 48.2
$Fe^{+2}$ percent _____ 1.5
$Fe^{+3}$ percent _____ 46.7
FeO percent _____ <.05
$SiO_2$ percent _____ 4.56
$Al_2O_3$ percent _____ 0.60
CaO percent _____ 17.1
MgO percent _____ 7.6
$CaO/SiO_2$ percent _____ 3.75
Iron as iron oxide (calculated) percent _____ 68.8

As noted above the compression test and tumble index percent, +3 mesh, have low values. The deterioration of the properties indicates that additions of fluxstone greater than 30% should not be made.

By high calcium limestone we mean a limestone which contains at least about 95% calcium carbonate ($CaCO_3$) and the remainder incidental impurities. Dolomite is a double carbonate of calcium and magnesium $CaMg(CO_3)_2$ containing about 56% calcium carbonate and about 41% to about 44% magnesium carbonate, the remainder incidental impurities. Of course it must be understood that mineralogically dolomite is a distinct crystallized mineral and only after calcination does a mixture of calcium oxide and magnesium oxide occur.

As previously noted, blast furnace flue dusts can contain up to 50% carbon. To reduce the carbon to the desired levels, the blast furnace flue dusts are treated by conventional froth-flotation processes or are calcined. The carbon levels are reduced to below about 5% and preferably 2%. The additions of the treated blast furnace flue dusts provide a carbon level of not more than 0.5% in the mix.

Of course it is known that about 5% to 11% moisture is added to the mix to obtain the desired balling consistency. It is also well known that bentonite may be added as a binder to hold the green balls together prior to firing at elevated temperatures.

The green balls are dried at about 212° F. to about 600° F. for a time sufficient to remove the moisture in the balls at a rate insufficient to cause explosion of the green balls. The dried balls are heated in an oxidizing atmosphere to within a temperature range of about 1000° F. to about 1200° F. in a furnace, for example, a traveling grate, a rotary kiln, etc., wherein substantially all the materials which react exothermically with oxygen are either burned off or oxidized. These materials are carbon, metallic iron and ferrous iron. Substantially all the metallic iron and ferrous iron are oxidized to a higher valence state in the form of iron oxides. A portion of the carbon, metallic iron and ferrous iron does remain in the balls after firing within the above temperature range. The portion remaining aids in the calcination of the fluxstone within a temperature range of about 1600° F. to about 2150° F. when the balls are being heated to the hardening temperature range of about 2150° F. to about 2350° F. The amount of carbon, metallic iron and ferrous iron remaining in the balls after heating to within the temperature range of about 1000° F. to about 1200° F. is insufficient to cause a sudden increase in temperature in the balls as they are heated within the temperature range of about 1600° F. to about 2150° F. during hardening. The step of burning the carbon and oxidizing the iron at temperature levels of 1000° F. to 1200° F. results in a controllable, reproducible method of producing pellets having sufficient strength to resist degradation during handling, storage or transport. The firing of the dried balls may be accomplished on any conventional grate or grate-kiln apparatus or rotary kiln.

The pellets produced by the method of the invention contain about 70% to about 90% iron in the form of iron oxides and about 30% to 10% flux. Of course, incidental impurities such as silica and alumina are also present in the pellets since they are contained in the in-plant waste products. The flux is in the form of calcined fluxstone, that is, MgO and CaO.

It will be understood that wherever percentages are referred to in these specifications and claims, such percentages are on a weight basis unless otherwise noted.

A green ball is a spherical-like particle about ⅜ inch to about 1¼ inches in diameter of the mix formed in a balling disc, cone or drum.

A dried ball is a green ball which has been heated to within a temperature range of about 212° F. to about 600° F.

A pellet is a dried green ball which has been fired to a temperature between about 2150° F. and about 2350° F.

In a specific example of the invention, a mix of in-plant steel mill waste products and fluxstone was made having the following composition:

|  | Weight in grams | Percent in mix |
| --- | --- | --- |
| In-plant waste products containing metallic iron (Fines A): | | |
| Mill scale | 3,196.2 | 12.8 |
| Contractor fines | 299.6 | 1.2 |
| Scarfer spittings | 1,972.6 | 7.9 |
| BOF classifier sands | 374.4 | 1.5 |
| Total | | 23.4 |
| In-plant waste products containing oxides of iron: | | |
| BOF fume | 1,098.7 | 4.4 |
| Blast furnace flue dust: | | |
| Dry | 2,022.6 | 8.1 |
| Wet | 1,448.3 | 5.8 |
| Erie pellet fines | 5,992.8 | 24.0 |
| Pea Ridge pellet fines | 2,996.4 | 12.0 |
| Hot mill sludge | 287.2 | 1.15 |
| Cold mill sludge | 287.2 | 1.15 |
| Total | | 56.60 |
| Fluxstone: Dolomite | 4,994.0 | 20.0 |

Before mixing, the blast furnace flue dust was subjected to froth-flotation to reduce the carbon therein to a level so that the carbon content of the entire mixture of in-plant fines and fluxstone was about 0.5%.

The mix was ground. Substantially all the particles were −10 mesh sieve size. About 10% moisture was added to the mix to aid in forming green balls about 3/8″ φ to 5/8″ φ. The balls were fed to a grate furnace. The balls were dried at a temperature of 400° to 600° F. for 7 minutes. The balls were preheated to 800° F. for 3 minutes. The temperature was raised to 1200° F. for 13 minutes wherein substantially all the solid carbonaceous reductant was removed from the balls. A substantial portion but not all of the iron present as metallic iron and ferrous iron was oxidized to FeO, $Fe_2O_3$ or $Fe_3O_4$. The temperature of the balls was raised to 1800° F. for 1 minute. The balls were then heated to 2250° F. and held at this temperature for 16 minutes (during which time the pellet bed temperature raised to a temperature between 2150° F. and 2350° F.). The pellets were discharged from the furnace and cooled to ambient temperature in 9 minutes by blowing ambient air onto them.

The pellets were tested by standard tests. The results are as follows:

Test:                                Results
    Compression, pound/pellet _____ 606
    Tumble index:
        Percent +3 mesh _____ 95.2
        Percent +28 mesh _____ 99.6
    Linder test:
        Degradation percent −14 mesh _____ 10.0
        Percent reduction _____ 73.8
        Compression after reduction, pound/pellet _____ 74
    Gakushin test:
        Volume increase percent _____ 2.6
        Percent reduction _____ 66.8
        Percent whole pellet survival _____ 100
    Density:
        Air pycnometer _____ 4.0
        Hg displacement _____ 4.1
        Percent porosity _____ 0
    Percent porosity:
        Hg porosimeter _____ 3.5

The pellets do contain voids but the voids are not connected and are sealed from the surface of the pellets. The pellets had the following chemical composition:

Percent
$Fe^t$ _____ 56.2
$Fe^{+2}$ _____ 7.6
$SiO_2$ _____ 4.58
$Al_2O_3$ _____ 0.6
$CaO$ _____ 8.0
$MgO$ _____ 6.0
$CaO/SiO_2$ _____ 1.75
B/A _____ 2.7
Iron as iron oxide (calculated) _____ 80.1

We claim:

1. A method for producing highly-fluxed pellets containing iron oxides and flux materials from in-plant waste products, comprising:
   (a) forming a mix of about 70% in-plant waste products containing not more than about 0.5% carbon, and up to about 30% of a fluxstone,
   (b) balling the mix to form balls,
   (c) charging the balls into a furnace,
   (d) drying the balls,
   (e) heating the balls to within a temperature range of about 1000° F. to about 1200° F. in an oxidizing atmosphere for a time sufficient to oxidize a substantial portion of the heat producing materials therefrom,
   (f) increasing the temperature of the balls to within a temperature range of about 2150° F. to about 2350° F. in an oxidizing atmosphere for a time sufficient to form pellets, and
   (g) discharging the pellets from the furnace.

2. A method for producing pellets containing about 65% to about 90% oxides of iron and about 8% to about 25% of a flux, comprising:
   (a) forming a mix of about 20% of at least one in-plant waste product taken from the group consisting of mill-scale, scarfer spittings, magnetic slag fines and admixtures thereof, not less than about 50% of at least one in-plant waste product taken from the group consisting of BOF fume, blast furnace flue dust, open hearth fume, pellet fines, and hot and cold mill sludge and admixtures thereof, and about 10% to about 30% of a fluxstone,
   (b) balling the mix to form balls,
   (c) charging the balls into a furnace,
   (d) heating the balls to within a temperature range of about 212° F. to about 600° F. to dry the balls,
   (e) raising the temperature of the balls to within a temperature range of about 1000° F. to about 1200° F., in an oxidizing atmosphere for a time sufficient to burn off substantially all the carbon therein and to oxidize substantially all the metallic iron and ferrous iron to higher oxides of iron,
   (f) raising the temperature of the balls to between about 2150° F. to about 2350° F. in an oxidizing atmosphere for a time sufficient to substantially completely oxidize all the metallic iron to iron oxide and all the ferrous oxide to higher valence states of iron, and to form pellets, and
   (g) discharging the pellets from the furnace.

3. The method of claim 1 in which the fluxstone of step (a) is about 10% high calcium limestone and 20% dolomite.

4. The method of claim 1 in which the fluxstone of step (a) is dolomite.

5. The method of claim 2 in which the fluxstone of step (a) is about 10% high calcium limestone and 20% dolomite.

6. The method of claim 2 in which the fluxstone of step (a) is dolomite.

7. A method for producing highly-fluxed pellets containing iron oxides and flux materials from in-plant waste products, comprising:
   (a) forming a mix of about 25% of at least one in-plant waste product taken from the group consisting of mill-scale, scarfer spittings, magnetic slag fines and admixtures thereof, about 55% of at least one in-plant waste product taken from the group consisting of BOF fume blast furnace flue dust, open hearth fume, pellet fines and hot and cold mill sludges and admixtures thereof, and about 20% dolomite,
(b) balling the mix to form balls,
(c) charging the balls into a furnace,
(d) heating the balls to within a temperature range of about 212° F. to about 600° F. to dry the balls,
(e) raising the temperature of the balls to within a temperature range of about 1000° F. to about 1200° F. in an oxidizing atmosphere for a time sufficient to burn off substantially all the carbon therein and to oxidize substantially all the metallic iron and ferrous iron to higher oxides of iron,
(f) raising the temperature of the balls to within a temperature range of about 2150° F. to about 2350° F. in an oxidizing atmosphere for a time sufficient to substantially completely oxidize all the metallic iron to iron oxide and all the ferrous oxides to higher valence states of iron, and to form pellets, and
(g) discharging the pellets from the furnace.

References Cited

UNITED STATES PATENTS

| | | | |
|---|---|---|---|
| 2,373,244 | 4/1945 | Holz | 75—25 X |
| 2,511,400 | 6/1950 | de Jahn | 75—3 UX |
| 2,780,536 | 2/1957 | Carney | 75—5 |
| 3,146,088 | 8/1964 | Tsujihata et al. | 75—3 X |
| 3,153,587 | 10/1964 | Schuerger | 75—5 |
| 3,264,091 | 8/1966 | Ban | 75—5 |
| 3,314,780 | 4/1967 | Holowaty et al. | 75—3 |
| 3,316,081 | 4/1967 | Bratton | 75—3 |
| 3,547,623 | 12/1970 | Larpenteur et al. | 75—3 X |

FOREIGN PATENTS

| | | | |
|---|---|---|---|
| 790,738 | 2/1958 | Great Britain | 75—5 |

ALLEN B. CURTIS, Primary Examiner

U.S. Cl. X.R.

75—25